(12) United States Patent
Mallya

(10) Patent No.: US 10,256,975 B2
(45) Date of Patent: Apr. 9, 2019

(54) USING ENCRYPTION TO PROPAGATE COGNITIVE CORRECTIONS

(71) Applicant: INTERNATIONAL BUSINESS MACHINES CORPORATION, Armonk, NY (US)

(72) Inventor: Shailaja Mallya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 15/444,538

(22) Filed: Feb. 28, 2017

(65) Prior Publication Data

US 2018/0248696 A1    Aug. 30, 2018

(51) Int. Cl.
*H04L 9/32* (2006.01)
*H03M 13/09* (2006.01)
*G06F 17/27* (2006.01)

(52) U.S. Cl.
CPC .............. *H04L 9/32* (2013.01); *G06F 17/273* (2013.01); *G06F 17/276* (2013.01); *G06F 17/2795* (2013.01); *H03M 13/09* (2013.01)

(58) Field of Classification Search
None
See application file for complete search history.

(56) References Cited

U.S. PATENT DOCUMENTS

| 9,680,606 | B2* | 6/2017 | Licardie | ................ H04L 1/0061 |
| 2005/0049853 | A1 | 3/2005 | Lee et al. | |
| 2013/0151932 | A1* | 6/2013 | Matuz | ................ H03M 13/1105 714/776 |

OTHER PUBLICATIONS

Mell et al., "The NIST Definition of Cloud Computing", National Institute of Standards and Technology, Special Publication 800-145, Sep. 2011, 7 pages.
Hermans et al., "All is not Lost: Understanding and Exploiting Packet Corruption in Outdoor Sensor Networks", Wireless Sensor Networks, vol. 8354 of the series Lecture Notes in Computer Science, pp. 116-132, 2014.
White et al., "Phonotactic Reconstruction of Encrypted VoIP Conversations: Hookt on fon-iks", Security and Privacy (SP), 2011 IEEE Symposium, Date of Conference: May 22-25, 2011, pp. 1-16.
IBM, "Watson Documentation", IBM Watson Developer Cloud, printed on Feb. 24, 2017, pp. 1-4, https://www.ibm.com/watson/developercloud/doc/index.html.

(Continued)

*Primary Examiner* — Fatoumata Traore
(74) *Attorney, Agent, or Firm* — Anthony M. Pallone

(57) ABSTRACT

An embodiment of the invention may include a method, computer program product and system for data transfer. The embodiment may include receiving, by a relay node, a data payload from a data sending program intended for a data receiving program. The embodiment may include determining whether the received data payload is numeric data or non-numeric data based on a payload length associated with the received data payload. The embodiment may include creating a corrected data payload by performing at least one cognitive correction to the non-numeric data payload based on determining that the received data payload contains non-numeric data. The embodiment may include transmitting the corrected data payload.

14 Claims, 7 Drawing Sheets

(56) References Cited

OTHER PUBLICATIONS

Kiger, "10 Best Ideas for Interplanetary Communication", Science | Future Space, printed on Dec. 7, 2016, pp. 1-14, http://science.howstuffworks.com/10-ideas-for-interplanetary-communication.htm.

Wikipedia, the Free Encyclopedia, "Interplanetary Internet", printed on Dec. 7, 2016, pp. 1-4, https://en.wikipedia.org/wiki/Interplanetary_Internet.

Jackson, "The Interplanetary Internet", IEEE Spectrum, Posted Aug. 1, 2005, pp. 1-7, http://spectrum.ieee.org/telecom/internet/the-interplanetary-internet.

Davidovich et al., "Concept for Continuous Inter-Planetary Communications", Space Studies Institute, 1999, pp. 213-224.

Akyildiz et al., "InterPlaNetary Internet: state-of-the-art and research challenges", Computer Networks, vol. 43, pp. 75-112, 2003.

Arora, "How secure is AES against brute force attacks", EE Times, May 7, 2012, pp. 1-6, http://www.eetimes.com/document.asp?doc_id=1279619.

Kinghorn, "Linpack performance Haswell E (Core i7 5960X and 5930K)", Puget Systems, Aug. 29, 2014, pp. 1-5, https://www.pugetsystems.com/labs/hpc/Linpack-performance-Haswell-E-Core-i7-5960X-and-5930K-594/.

CCSDS, The Consultative Committee for Space Data Systems, "CCSDS File Delivery Protocol (CFDP)", Blue Book, Jan. 2007, 146 pages.

Wikipedia, the Free Encyclopedia, "Brute-force attack", printed on Dec. 7, 2016, pp. 1-4, https://en.wikipedia.org/wiki/Brute-force attack.

Hanumanthappa et al., "Metrics for evaluating phonetics machine translation in natural Language Processing through Modified Edit distance algorithm—A Naive Approach", 2015 International Conference on computer Communication and Informatics (ICCCI-2015), Jan. 8-10, 2015, pp. 1-7.

Mays et al., Abstract for "Context based spelling correction", Information Processing and Management, vol. 27, Issue 5, 1991, pp. 517-522.

Scott et al., "Bundle Protocol Specification", NASA Jet Propulsion Laboratory, Network Working Group, RFC 5050, Nov. 2007, pp. 1-50.

Liu et al., "Intelligent OCR Editor", CCECE/CCGEI 1993, IEEE, pp. 9-11.

Tensorflow, "Vector Representations of Words", Tutorial for word2vec model by Mikolov et al., printed on Feb. 24, 2017, pp. 1-12, https://www.tensorflow.org/tutorials/word2vec.

\* cited by examiner

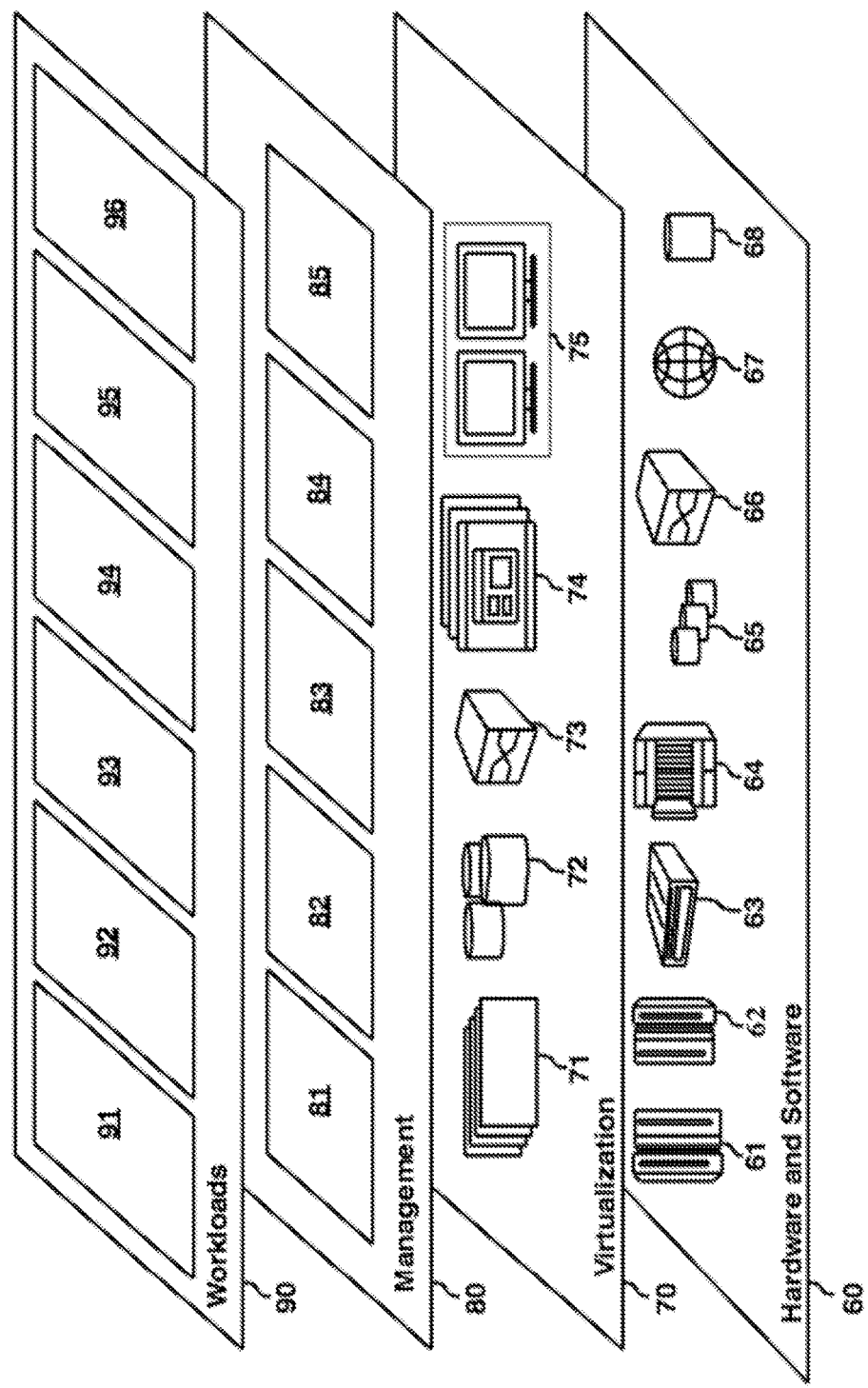

USING ENCRYPTION TO PROPAGATE COGNITIVE CORRECTIONS

BACKGROUND

The present invention relates to maintaining the integrity of data sent across a network spanning great distances, and more specifically, to tracking any cognitive corrections made to the data as it travels through the network.

Data corruption during transmission may have several causes. For example, data may be lost as a result of extreme path loss due to vast distances between communicating objects. Environmental conditions may also contribute to data corruption, especially when transmitting data wirelessly. For instance, space radiation may degrade data clarity or data transmissions may be blocked by other bodies (e.g. heavy clouds).

BRIEF SUMMARY

An embodiment of the invention may include a method, computer program product and system for data transfer. The embodiment may include receiving, by a relay node, a data payload from a data sending program intended for a data receiving program. The embodiment may include determining whether the received data payload is numeric data or non-numeric data based on a payload length associated with the received data payload. The embodiment may include creating a corrected data payload by performing at least one cognitive correction to the non-numeric data payload based on determining that the received data payload contains non-numeric data. The embodiment may include transmitting the corrected data payload.

BRIEF DESCRIPTION OF THE DRAWINGS

FIG. 5 depicts abstraction model layers according to an embodiment of the present invention.

DETAILED DESCRIPTION

Embodiments of the present invention will now be described in detail with reference to the accompanying Figures.

Maintaining data integrity across a network is a paramount concern for organizations engaged in long distance communications. For example, organizations involved in scientific research utilizing time-insensitive scientific data (TISD) delivery, the ability to transmit data payloads across vast distances without error or data loss is imperative. Data corruption, in the form of a small error or loss of data, in any scientific data payload delivery can lead to huge discrepancies in data analysis and interpretation. As TISD can bear delay but not loss, the network over which it is sent must be reliable. However, situations may occur where the reliability of the network environment is questionable and error correction at the network layer is insufficient. A scientific payload transmitted over a cloud infrastructure where the cloud hardware belongs to a third party cloud vendor can be an example of such an environment as the cloud consumers may question the reliability of the hardware that the cloud is hosting.

To avoid a situation where an unreliable network may lead to data corruption (e.g. an error in or a loss of transmitted data), a cognitive correction relay (CCR) system 100, described below, performs a method for using cognitive correction to recover lost non-numerical data, propagating the corrections throughout a network, and providing an overall confidence level of the transmission based on the cognitive correction(s) made to the transmitted non-numerical data. CCR system 100 alleviates reliability concerns in the network layer by adding reliability into the logical layer through the implementation of cognitive software in error correction of non-numerical data. In the case of numerical data, CCR system 100, performs a method for encrypting the numerical data using an encryption algorithm like the data encryption standard (DES), however the key for encryption will be the numerical data itself. Using the numerical data itself as the encryption key allows for brute force determination of the key and eliminates any dependency on key management.

Figure 1A:
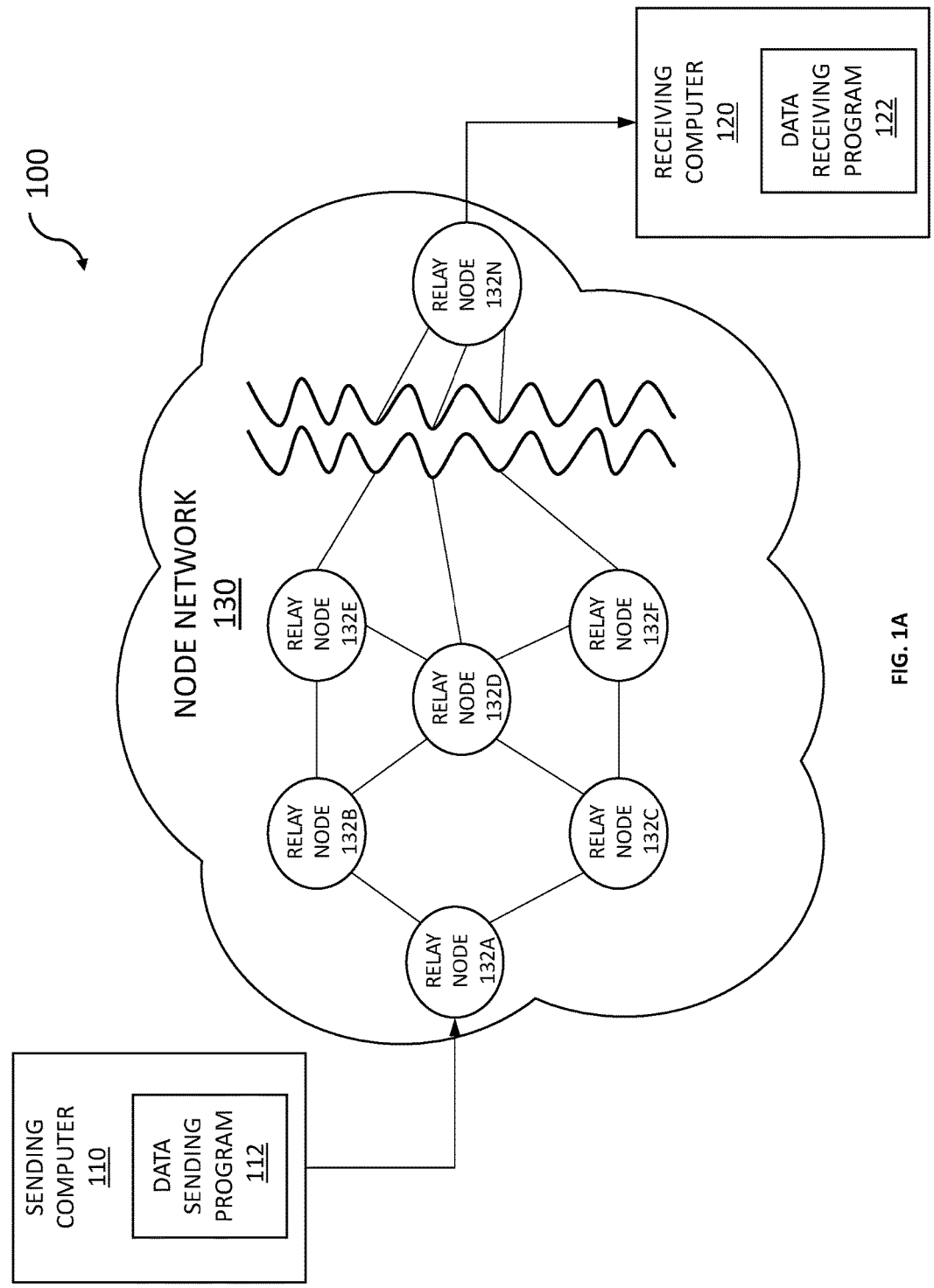
FIG. 1A illustrates cognitive correction relay (CCR) system, in accordance with an embodiment of the present invention.

FIG. 1A illustrates CCR system 100, in accordance with an embodiment of the present invention. CCR system 100 may be a distributed communication environment, including sending computer 110 and receiving computer 120 interconnected via node network 130. According to at least one implementation, CCR system 100 may include a plurality of sending computers 110 and receiving computers 120, only one of each being shown for illustrative brevity.

Node network 130 may include relay nodes 132A-N, described in more detail with reference to FIG. 1B. Node network 130 may be implemented as, for example, a relay network, where sending computer 110 and receiving computer 120 are interconnected over vast distances by means of relay nodes. Node network 130 may comprise a plurality of relay nodes (e.g. relay nodes 132A-N) executing the same software to collectively process and relay data between other computing devices such as sending computer 110 and receiving computer 120. Furthermore, node network 130 may also be implemented as, for example, a local area network (LAN), a wide area network (WAN) such as the Internet, or a combination of the two. Node network 130 may include, for example, wired, wireless or fiber optic connections. In general, node network 130 may be any combination of connections and protocols that will support communications between sending computer 110 and receiving computer 120, in accordance with an embodiment of the invention. In an example embodiment, data sending program 112 transmits data from sending computer 110 to relay node 132A. Relay node 132A may then propagate the data throughout node network 130 via relay nodes 132A-F. Furthermore, in an example embodiment, relay node 132N may send the data to data receiving program 122 on receiving computer 120.

Sending computer 110 may include a data sending program 112. Sending computer 110 may be a desktop computer, a notebook, a laptop computer, a tablet computer, a handheld device, a smartphone, a thin client, or any other electronic device or computing system capable of sending data to other computing devices such as receiving computer 120 via node network 130. In an example embodiment, sending computer 110 may send data to receiving computer 120. However, in other embodiments, the roles of sending computer 110 and receiving computer 120 may be reversed and sending computer 110 may also receive data. Furthermore, in an example embodiment, sending computer 110 may send non-numerical data. However, sending computer 110 may also send numerical data. Sending computer 110 is described in more detail with reference to FIG. 3.

Data sending program 112 is a program situated on sending computer 110 that may send data to data receiving program 122, located on receiving computer 120. Data sending program 112 may include components used to send data from sending computer 110 to data receiving program 122, via node network 130. In an example embodiment, data sending program 112 may send non-numerical data. However, data sending program 112 may also send numerical data. While sending numerical data, data sending program 112 may send each number (including units and decimal points) in a separate packet. Furthermore, data sending program 112 may send a fixed number of redundant numerical data packets to minimize loss of the packet itself. Data sending program 112 may encrypt every sent numerical data packet. In other embodiments, data sending program 112 may also receive data from data receiving program 122, via node network 130.

Receiving computer 120 may include a data receiving program 122. Receiving computer 120 may be a desktop computer, a notebook, a laptop computer, a tablet computer, a handheld device, a smartphone, a thin client, or any other electronic device or computing system capable of receiving data from other computing devices such as sending computer 110 via node network 130. In an example embodiment, receiving computer 120 may receive data from sending computer 110. However, in other embodiments, the roles of receiving computer 120 and sending computer 110 may be reversed and receiving computer 120 may also send data. Furthermore, in an example embodiment, receiving computer 120 may receive non-numerical data. However, receiver computer 120 may also receive numerical data. Receiver computer 120 is described in more detail with reference to FIG. 3.

Data receiving program 122 is a program situated on receiving computer 120 that may receive data sent from data sending program 112, located on sending computer 110. Data receiving program 122 may include components used to receive data sent from data sending program 112, via node network 130. In an example embodiment, data receiving program 122 may receive non-numerical data. However, data receiving program 122 may also receive numerical data. Furthermore, in other embodiments, data receiving program 122 may also send data to data sending program 112, via node network 130.

Figure 1B:
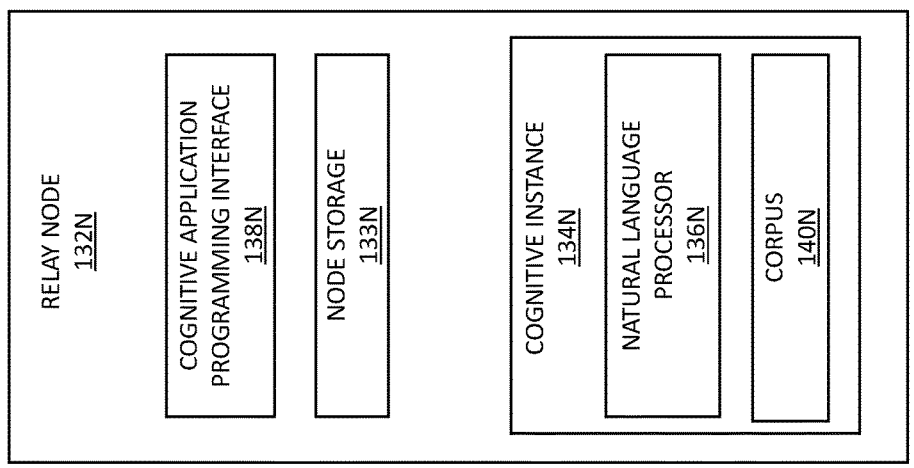
FIG. 1B, illustrates a relay node within the CCR system of FIG. 1, in accordance with an embodiment of the present invention.

FIG. 1B illustrates relay node 132N, in accordance with an embodiment of the present invention. Relay node 132N may include a cognitive instance 134N, cognitive application programming interface 138N, and a node storage 133N. Relay node 132N may be a desktop computer, a notebook, a laptop computer, a server, a blade, a satellite or any other electronic device or computing system capable of sending and receiving data to and from other computing devices such as sending computer 110 and receiving computer 120 via node network 130, and capable of hosting cognitive instance 134N and cognitive application programming interface 138N. Relay node 132N may also send and receive data to and from other relay nodes within node network 130. In an example embodiment, relay node 132N may send or receive numerical or non-numerical data. In an example embodiment where relay node 132N receives encrypted numerical data, relay node 132N may decrypt the received numerical data. Furthermore, in an example embodiment, relay node 132N may encrypt the received numerical data before propagating the data. Relay node 132N is described in more detail with reference to FIG. 3.

Corpus 140N may be a specialized database containing a body of knowledge or data that may form the factual basis for any cognitive determinations. For example, Corpus 140N may contain scientific data and mission related details obtained from cognitive application programming interface 138N, according to the embodiments of the invention. In an example embodiment, corpus 140N may contain structured texts related to scientific data and mission details. Corpus 140N may be configured as part of relay node 132N, according to an embodiment of the invention. In an optional embodiment, corpus 140N may be accessed by relay node 132N remotely, by, for example, being a virtual instance of a corpus located outside of the Node 132N.

Node storage 133N may be a database located on relay node 132N. Node storage 133N may temporarily store data associated with an incoming data transmission. Additionally, node storage 133N may store a pre-shared key used for scrambling and unscrambling of transmitted data. In an example embodiment, the pre-shared key may be shared across all relay nodes (i.e. relay nodes A-N) within node network 130.

Cognitive instance 134N is a program situated on relay node 132N that may communicate with sending computer 110, receiving computer 120, and other cognitive instances within node network 130, via node network 130. Cognitive instance 134N may include a natural language processor (NLP) 136N and corpus 140N. Cognitive instance 134N uses cognitive technology (i.e. NLP 136N) to perform error corrections of non-numerical data transmitted from sending computer 110 to receiving computer 120 via node network 130. Additionally, cognitive instance 134N uses cognitive technology to identify and propagate corrected non-numerical data throughout node network 130 and provide an overall confidence level of the corrections made when the transmitted non-numerical data is received by receiving computer 120. In an example embodiment, cognitive instance 134N may be implemented through the capabilities offered by IBM Watson® (Watson and all Watson-based trademarks and logos are trademarks or registered trademarks of International Business Machines Corporation and/or its affiliates). In an example embodiment, cognitive instance 134N receives non-numerical data from sending computer 110, utilizes NLP 136N to perform corrections within the received non-numerical data, and propagates the corrected non-numerical data to the next relay node within node network 130 or to receiving computer 120.

Natural language processor 136N may be a software application or configuration in a software application capable of speech recognition and parsing of non-numerical data, such as voice payloads and text payloads, received from sending computer 110 or from other cognitive instances within node network 130. For voice payloads, NLP 136N may first implement speech to text conversion on data segments to identify sentences and then form logical units of related text to identify data according to corpus 140N. For text payloads, NLP 136N may parse the transmitted non-numerical data to form logical units of related text to identify data, based on the information contained in corpus 140N. In an example embodiment, natural language processor 136N may be implemented through the natural language classifier service offered by IBM Watson®.

Cognitive application programming interface (CAPI) 138N may be a software application or configuration in a software application capable of reconstructing messages, intended for receiving computer 120, which incorporate corrections for corrupted or lost non-numerical data. CAPI 138N may receive data from sending computer 110 or from other cognitive instances within node network 130. CAPI 138N may utilize a pre-shared key by which it can unscramble previously reconstructed non-numerical data received from other cognitive instances within node network 130. Additionally, CAPI 138A-G may utilize a pre-shared key by which it can scramble any presently implemented corrections of non-numerical data before propagating the data throughout node network 130. In an example embodiment, CAPI 138N may utilize the capabilities offered by a cognitive program such as IBM Watson®. The operations and functions of CAPI 138A-G, as implemented together with cognitive instance 132N, are described in further detail below with regard to FIGS. 2A and 2B.

Figure 2A:
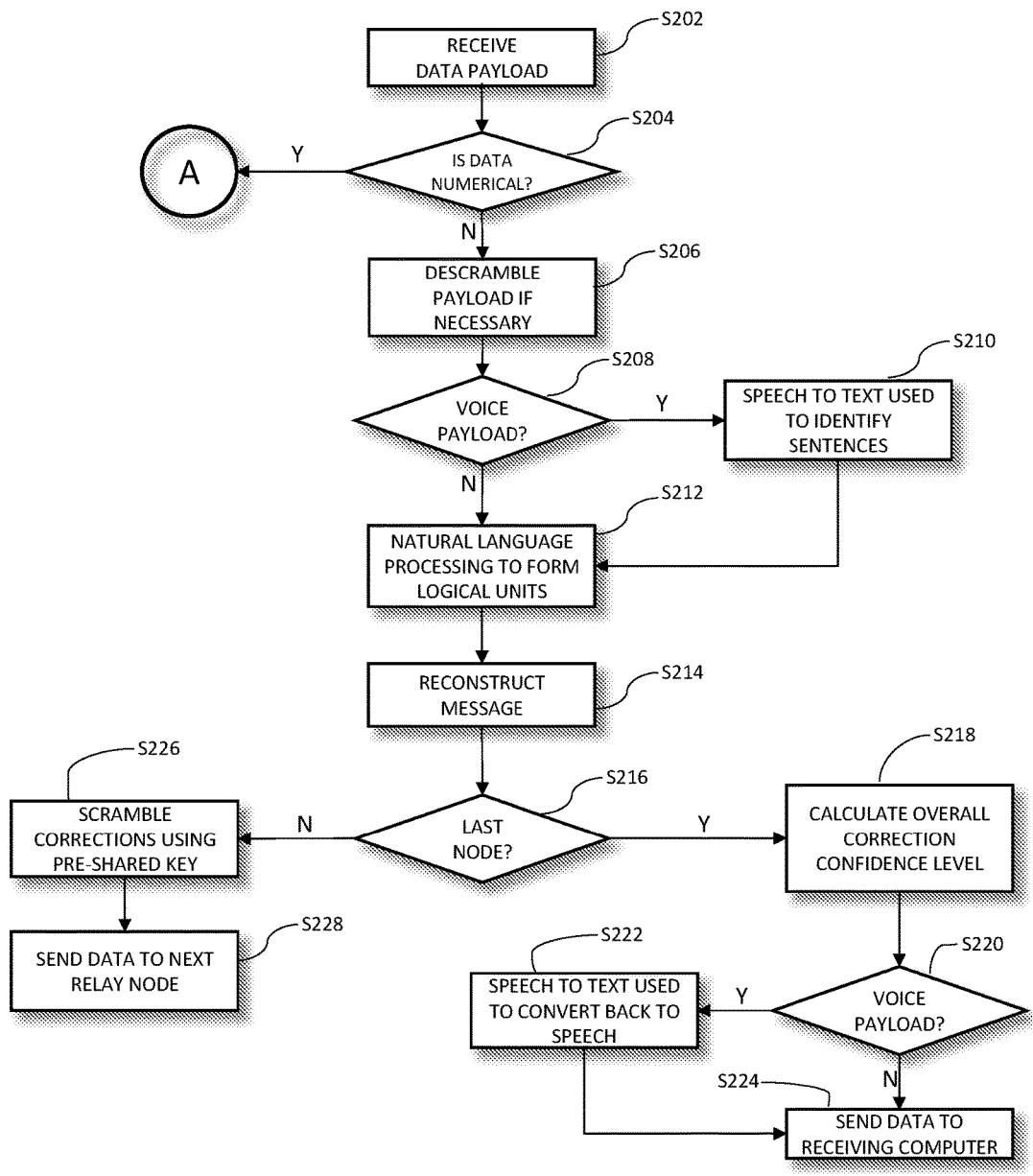
FIGS. 2A and 2B are a flowchart illustrating the operations the cognitive application programming interface of FIG. 1B, in accordance with an embodiment of the invention.
Figure 2B:
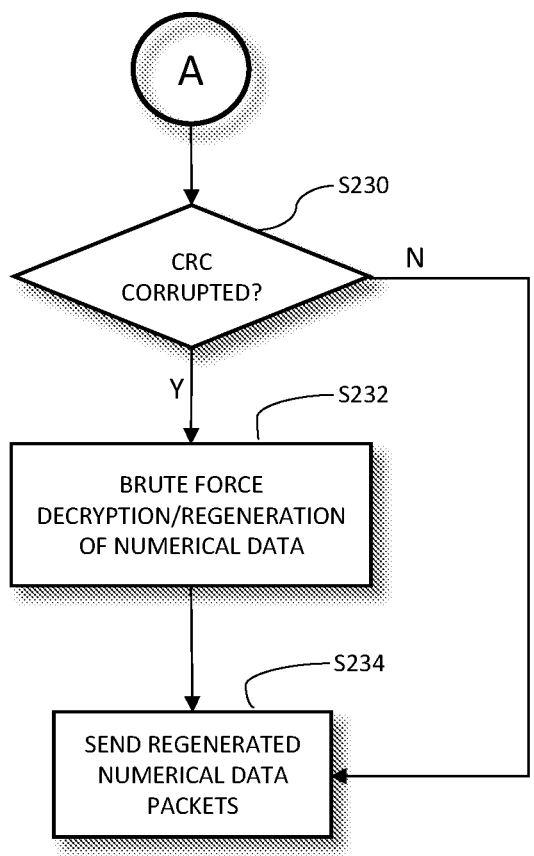

FIGS. 2A and 2B show a flow chart illustrating the operations of CAPI 138N in accordance with an embodiment of the invention. Referring to step S202, relay node 132N may receive a data payload from data sending program 112 or from another relay node within node network 130. The received data payload may be numerical data or non-numerical data. In the event non-numerical data is received, the received data payload may be partially scrambled by another relay node within node network 130. A received non-numerical data payload may be buffered to a threshold number of packets for analysis at the logical layer (i.e. analysis by cognitive instance 134N) even if a packet's cyclic redundancy check (used in current day error correction) does not indicate corruption. This is done because the nth packet in the non-numerical payload might be corrupted. As such, data prior and data after the corrupted packet is needed for effective cognitive correction. The threshold calculation may be implementation specific. In an example embodiment, relay node 132N may receive a data payload from relay node 132F. The data payload received from relay node 132F may be partially scrambled.

Referring to step S204, CAPI 138N determines if the data payload received in step S202 is numerical data by evaluating the length of the received data payload. Every numerical data packet may follow a format which includes a standard payload length of 16-bits. In an example embodiment, the standard payload length of 16-bits will be reserved only for numerical data payloads. Furthermore, in an example embodiment, a fixed number of redundant numerical data packets will be received to minimize loss of the packet itself. As the payload length is unique to numerical data and the number of redundant packets is predefined, CAPI 138N may easily identify redundant numerical data packets and assign each a sequence number. Additionally, every numerical data packet may follow a format where each numerical data packet begins and ends with a tag (i.e. <N> . . . <\N>) which is hardcoded or predetermined prior to the transmission by the communicating end points. If the data payload is numerical, CAPI 138N proceeds to step S236. If the data payload is non-numerical, CAPI 138N proceeds to step S206.

Referring to step S206, CAPI 138N may descramble portions of the data payload received in step S202, if necessary. The received data payload may contain previous corrections that were scrambled by a previous CAPI located on a previous relay node within node network 130 (i.e. relay nodes 132A-F). CAPI 138N may access a pre-shared key, stored in node storage 133N, by which it can scramble and unscramble corrections made to non-numerical data. In an example embodiment, cognitive instance 134N invokes CAPI 138N to unscramble the non-numerical data payload received from relay node 132F which may contain cognitive corrections performed by previous relay nodes within node network 130 (i.e. relay nodes 132A-F).

Referring to step S208, CAPI 138N determines if the data payload received in step S202 is a voice payload. If the data payload is a voice payload, CAPI 138N proceeds to step S210. If the data payload is not a voice payload (e.g. a text payload), CAPI 138N proceeds to step S212.

Referring to step S210, CAPI 138N may utilize NLP 136N to perform speech to text conversion of the voice payload determined in step S208 into a text payload. NLP 136N may then analyze the converted voice payload to identify sentences. In an example embodiment, CAPI 138N may invoke NLP 136N as a service offered by IBM Watson® (Watson® is a registered trademark of The International Business Machines Corporation).

Referring to step S212, NLP 136N may parse the text payload into logical units of structured texts. NLP 136N may then obtain information from corpus 140N for use in identifying the parsed logical units of structured texts in accordance with the structured texts stored in corpus 140N. NLP 136N may temporarily store the information obtained from corpus 140N in node storage 133N. NLP 136N may also temporarily store any unidentified parsed structured texts in node storage 133N. Additionally, NLP 136N may update corpus 140N with previously unidentified parsed structured texts from node storage 133N.

Referring to step S214, CAPI 138N may reconstruct the parsed data payload from step S212 while implementing any cognitive corrections. CAPI 138N may replace any corrupted words with tags and form as much of a sentence as possible. Based on the positioning of words in a sentence, CAPI 138N may identify what part of speech (e.g. noun, verb, etc.) the corrupted word denotes. CAPI 138N may then determine the context of the statement by processing prior or later statements. Based on the context, CAPI 138N may narrow down the number of "parts of speech" (e.g. adjective) that can be replaced for the corrupted word. CAPI 138N may further narrow down the list of words based on the length of the word for text, or time taken to pronounce the word for voice data. The resulting list of words will be a list of synonyms relating the determined context and having a probability of matching the corrupted original word. CAPI 138N may select any word from the list to replace the corrupted word. CAPI 138N may utilize information stored in node storage 133N for message reconstruction and then delete information stored in node storage 133N once the message reconstruction is complete.

Referring to step S216, CAPI 138N determines if relay node 132N is the last relay node within node network 130. If relay node 132N is the last relay node within node network 130, CAPI 138N proceeds to step S218. If relay node 132N is not the last relay node within node network 130, CAPI 138N proceeds to step S226.

Referring to step S218, CAPI 138N may calculate an overall communication confidence level for the cognitive corrections made to the non-numerical data payload before sending the data to receiving computer 120. Since every previous cognitive correction has been scrambled, CAPI 138N is easily able to identify every cognitive correction in step S206. During message reconstruction in step S214, corrupted words are replaced with synonyms which may slightly alter the tone or sentiment of the message. Therefore, an overall confidence level, calculated by the last receiving relay node, may help the message recipient determine how much of the communication can be trusted and accepted as is and how much of the communication needs to be deliberated upon. In an example embodiment, CAPI 138N may utilize cognitive instance 134N to calculate a cumulative word level confidence. Furthermore, in an example embodiment, the cumulative word level confidence may then be used to calculate a cumulative sentence level confidence which may then be used to calculate a cumulative confidence level for the overall communication.

Referring to step S220, CAPI 138N determines if the data payload reconstructed in step S214 is a voice payload. If the data payload is a voice payload, CAPI 138N proceeds to step S222. If the data payload is not a voice payload (e.g. a text payload), CAPI 138N proceeds to step S224.

Referring to step S222, CAPI 138N may utilize NLP 136N to perform text to speech conversion of the data payload reconstructed in step S214 back into a voice payload. In an example embodiment, CAPI 138N may invoke NLP 136N as a service offered by IBM Watson®.

Referring to step 224, CAPI 138N may send the cognitively corrected non-numerical data payload from step S214 to receiving computer 120. CAPI 138N may also send the overall confidence level, calculated in step S218, to receiving computer 120. The overall confidence level may be displayed via a graphical user interface associated with data receiving program 122, located on receiving computer 120.

Referring to step S226, CAPI 138N may scramble any new cognitive corrections made at the current relay node (i.e. relay node 132N). CAPI 138N may also scramble any previous corrections received from previous relay nodes within node network 130. CAPI 138N may utilize a pre-shared key, stored in node storage 133N, to scramble cognitive corrections made to portions of the non-numerical data. The pre-shared key is used only to scramble/descramble cognitive corrections made to non-numerical data and not for security. The cognitive corrections are scrambled so that they are readily identifiable by subsequent cognitive instances within node network 130. In an example embodiment, CAPI 138N, located on relay node 132N, may utilize a pre-shard key to scramble cognitive corrections made in previous relay nodes 132A-F.

Referring to step S228, CAPI 138N may send the non-numerical data from step S226 to the next relay node within node network 130. The transmitted non-numerical data may contain cognitive corrections which are scrambled using a pre-shared key.

Referring to step S230, every numerical data packet received by relay node 132N within node network 130 may be encrypted. CAPI 138N determines whether to decrypt numerical data packet based on evaluation of the cyclic redundancy check (CRC) for each packet. CAPI 138N may only decrypt those packets that have a corrupted CRC. If a numerical data packet CRC is not corrupted, CAPI 138N proceeds to step S234. If a numerical data packet is corrupted, CAPI 138N proceeds to step S232.

Referring to step S232, CAPI 138N may decrypt and regenerate the numerical data packet received in step S202. In an example embodiment, each numerical data packet may be encrypted using a symmetric key. The key is the numerical data payload itself including the tag (i.e. <N> ... <\N>). Therefore, 65536 binary combinations of keys must be tried to decrypt a 16-bit numerical data payload (16-bit key size=2^16=65536 combinations). The 16-bit key is generated to retrieve the first few bits which correspond to the tag. The 16-bit key is tried on all numerical data packets in the redundant packet set. If in any of the numerical packets the tag is successfully generated, CAPI 138N ceases the brute force processing. Else the same process is tried with the next 16-bit key out of the 65536 combinations of keys on all numerical data packets in the redundant packet set. Generating the starting tag of the numerical payload results in determining the key and having the key is equivalent to having the numerical data packet itself.

Referring to step S234, CAPI 138N may send the numerical data packet and a set of redundant packets to the next relay node within node network 130 or to receiving computer 120. Since the corrections performed for a numerical payload are based on encryption and is more accurate than cognitive corrections of non-numerical data, calculation of an overall confidence level is not required for numerical data.

Figure 3:
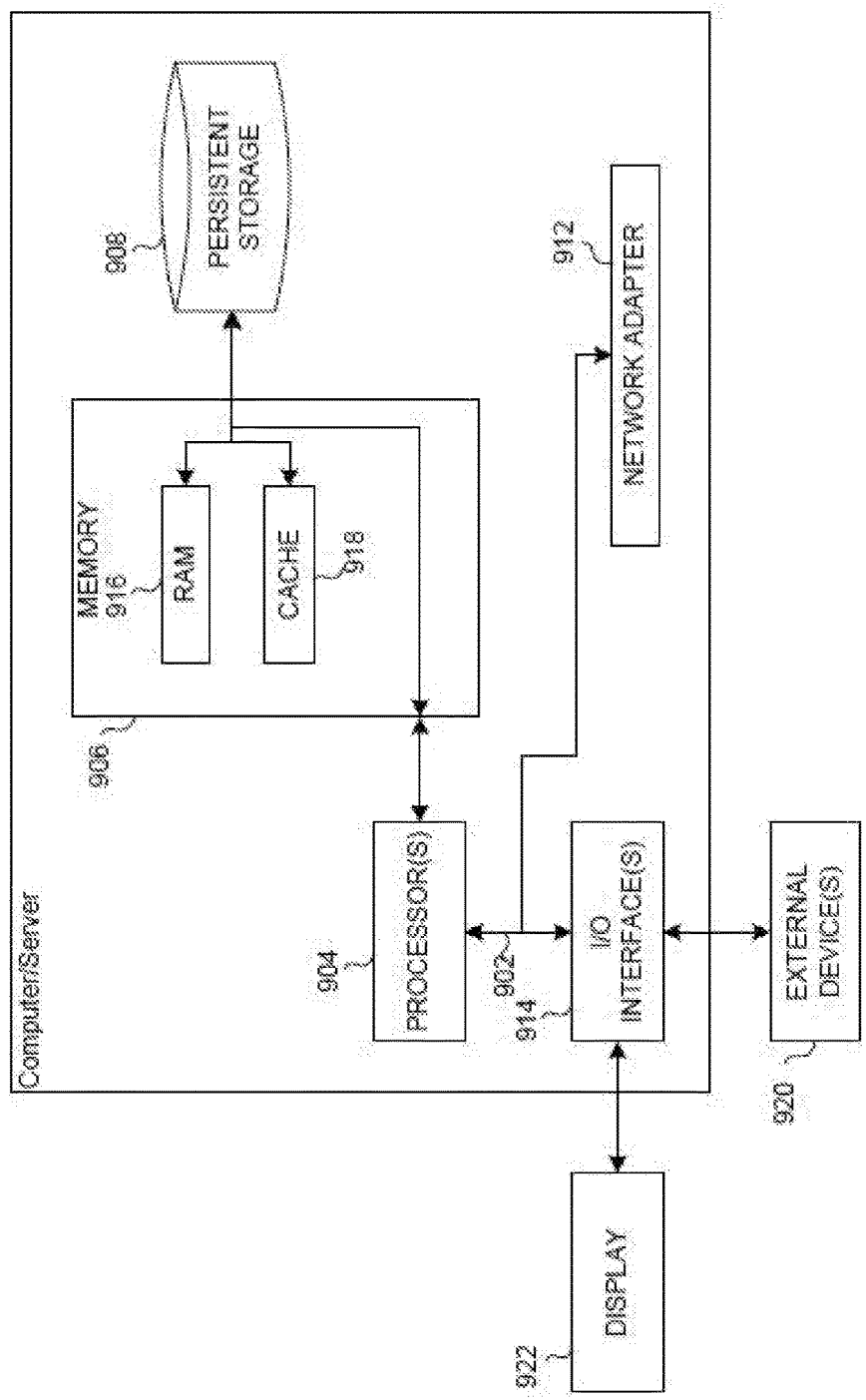
FIG. 3 is a block diagram depicting the hardware components of the CCR system of FIG. 1, in accordance with an embodiment of the invention.

FIG. 3 depicts a block diagram of components of sending computer 110, receiving computer 120, and relay node 132N, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Sending computer 110, receiving computer 120, and relay node 132N include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs cognitive instance 134N, natural language processor 136N, cognitive application programming interface 138N, node storage 133N, and corpus 140N in relay node 132N; and data sending program 112 in sending computer 110 and data receiving program 122 in receiving computer 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs cognitive instance 134N, natural language processor 136N, cognitive application programming interface 138N, node storage 133N, and corpus 140N in relay node 132N; and data sending program 112 in sending computer 110 and data receiving program 122 in receiving computer 120 may be downloaded to persistent storage 908 through communications unit 912.

I/O interface(s) 914 allows for input and output of data with other devices that may be connected to relay node 132N, sending computer 110, and receiving computer 120. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs cognitive instance 134N, natural language processor 136N, cognitive application programming interface 138N, node storage 133N, and corpus 140N in relay node 132N; and data sending program 112 in sending computer 110 and data receiving program 122 in receiving computer 120, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
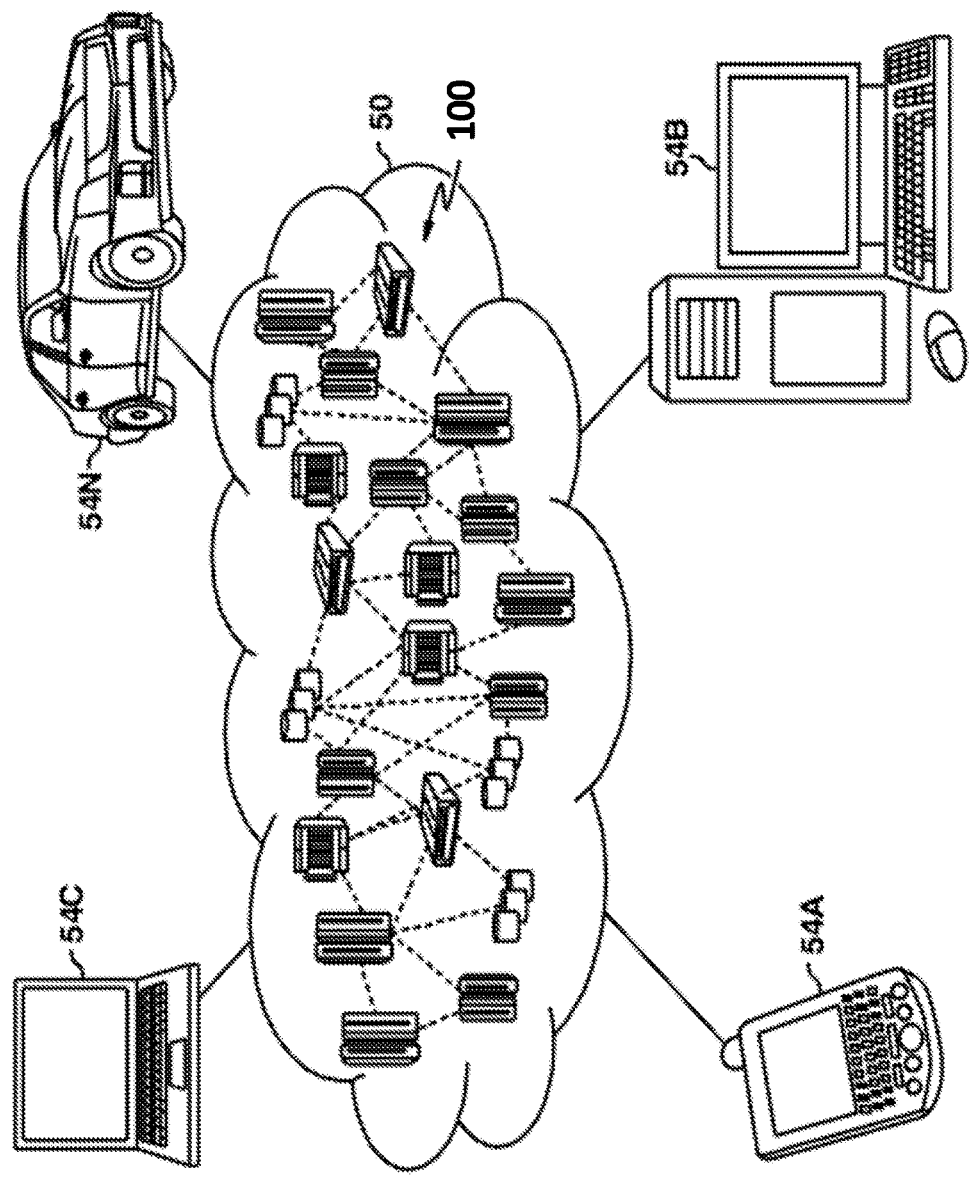
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and CCR system 96. CCR system 96 may relate to propagation of cognitive corrections throughout a node relay network.

What is claimed is:

1. A method for data transfer, the method comprising:
    receiving, by a relay node, a data payload from a data sending program intended for a data receiving program;
    determining whether the received data payload is numeric data or non-numeric data based on a payload length associated with the received data payload, wherein determining that the data payload is numeric data comprises determining a format of the numeric data payload includes; a length of 16-bits, a hardcoded start tag at a beginning of a data packet, and a hardcoded end tag at an end of the data packet;
    based on determining that the received data payload contains non-numeric data, creating a corrected data payload by performing at least one cognitive correction to the non-numeric data payload;
    based on determining that the received data payload contains numeric data, determining whether the numeric data is corrupted based on an evaluation of a cyclic redundancy check;
    based on determining that the numeric data has been corrupted, reconstructing the numeric data using brute force processing, wherein brute force processing comprises testing each data combination to determine if it works as a key; and
    transmitting the corrected data payload.

2. The method of claim 1, wherein performing at least one cognitive correction to the non-numeric data payload comprises:
    determining that the non-numeric data payload contains corrupted data, wherein the corrupted data comprises a characteristic from the group consisting of: an error in data and a loss of data; and
    replacing the corrupted data in the non-numeric data payload by:
        performing natural language processing on the non-numeric data payload;
        determining a cognitive correction to replace the corrupted data based on the natural language processing, wherein the cognitive correction comprises a word substitution based on a probability that the word substitution matches an original data payload; and
        replacing the corrupted data with the cognitive correction.

3. The method of claim 2, wherein replacing the corrupted data with the cognitive correction comprises scrambling the cognitive correction.

4. The method of claim 3, further comprising:
    based on determining that the relay node is the last node, determining an overall confidence level for the corrected data payload, wherein determining the overall confidence level is based on the scrambled cognitive correction of the non-numeric data payload; and transmitting the overall confidence level with the corrected data payload.

5. The method of claim 1, wherein brute force processing of the numeric data comprises:
generating 65536 binary combinations of 16-bit keys;
evaluating the generated binary combinations of 16-bit keys as a key to decrypt the numeric data; and
determining that an evaluated 16-bit key retrieves the hardcoded start tag of the numeric data payload.

6. A computer program product for data transfer, the computer program product comprising:
one or more computer-readable storage devices and program instructions stored on at least one of the one or more non-transitory tangible storage devices, the program instructions comprising:
program instructions to receive, by a relay node, a data payload from a data sending program intended for a data receiving program;
program instructions to determine whether the received data payload is numeric data or non-numeric data based on a payload length associated with the received data payload, wherein determining that the data payload is numeric data comprises determining a format of the numeric data payload includes; a length of 16-bits, a hardcoded start tag at a beginning of a data packet, and a hardcoded end tag at an end of the data packet;
based on determining that the received data payload contains non-numeric data, program instructions to create a corrected data payload by performing at least one cognitive correction to the non-numeric data payload;
based on determining that the received data payload contains numeric data, program instructions to determine whether the numeric data is corrupted based on an evaluation of a cyclic redundancy check;
based on determining that the numeric data has been corrupted, program instructions to reconstruct the numeric data using brute force processing, wherein brute force processing comprises program instructions to test each data combination to determine if it works as a key; and
program instructions to transmit the corrected data payload.

7. The computer program product of claim 6, wherein performing at least one cognitive correction to the non-numeric data payload comprises:
program instructions to determine that the non-numeric data payload contains corrupted data, wherein the corrupted data comprises a characteristic from the group consisting of: an error in data and a loss of data; and
program instructions to replace the corrupted data in the non-numeric data payload by:
performing natural language processing on the non-numeric data payload;
determining a cognitive correction to replace the corrupted data based on the natural language processing, wherein the cognitive correction comprises a word substitution based on a probability that the word substitution matches an original data payload; and
replacing the corrupted data with the cognitive correction.

8. The computer program product of claim 7, wherein replacing the corrupted data with the cognitive correction comprises program instructions to scramble the cognitive correction.

9. The computer program product of claim 8, further comprising:
based on determining that the relay node is the last node, program instructions to determine an overall confidence level for the corrected data payload, wherein determining the overall confidence level is based on the scrambled cognitive correction of the non-numeric data payload; and
program instructions to transmit the overall confidence level with the corrected data payload.

10. The computer program product of claim 6, wherein brute force processing of the numeric data comprises:
program instructions to generate 65536 binary combinations of 16-bit keys;
program instructions to evaluate the generated binary combinations of 16-bit keys as a key to decrypt the numeric data; and
program instructions to determine that an evaluated 16-bit key retrieves the hardcoded start tag of the numeric data payload.

11. A computer system for data transfer, the computer system comprising:
one or more processors, one or more computer-readable memories, one or more computer-readable tangible storage devices, and program instructions stored on at least one of the one or more storage devices for execution by at least of the one or more processors via at least one of the one or more memories, the program instructions comprising:
program instructions to receive, by a relay node, a data payload from a data sending program intended for a data receiving program;
program instructions to determine whether the received data payload is numeric data or non-numeric data based on a payload length associated with the received data payload, wherein determining that the data payload is numeric data comprises determining a format of the numeric data payload includes; a length of 16-bits, a hardcoded start tag at a beginning of a data packet, and a hardcoded end tag at an end of the data packet;
based on determining that the received data payload contains non-numeric data, program instructions to create a corrected data payload by performing at least one cognitive correction to the non-numeric data payload;
based on determining that the received data payload contains numeric data, program instructions to determine whether the numeric data is corrupted based on an evaluation of a cyclic redundancy check;
based on determining that the numeric data has been corrupted, program instructions to reconstruct the numeric data using brute force processing, wherein brute force processing comprises program instructions to test each data combination to determine if it works as a key; and
program instructions to transmit the corrected data payload.

12. The computer system of claim 11, wherein performing at least one cognitive correction to the non-numeric data payload comprises:
program instructions to determine that the non-numeric data payload contains corrupted data, wherein the corrupted data comprises a characteristic from the group consisting of: an error in data and a loss of data; and program instructions to replace the corrupted data in the non-numeric data payload by:

performing natural language processing on the non-numeric data payload;

determining a cognitive correction to replace the corrupted data based on the natural language processing, wherein the cognitive correction comprises a word substitution based on a probability that the word substitution matches an original data payload; and replacing the corrupted data with the cognitive correction.

13. The computer system of claim 12, wherein replacing the corrupted data with the cognitive correction comprises program instructions to scramble the cognitive correction.

14. The computer system of claim 13, further comprising:

based on determining that the relay node is the last node, program instructions to determine an overall confidence level for the corrected data payload, wherein determining the overall confidence level is based on the scrambled cognitive correction of the non-numeric data payload; and program instructions to transmit the overall confidence level with the corrected data payload.

* * * * *